United States Patent [19]

Kawaki et al.

[11] Patent Number: 5,387,652

[45] Date of Patent: Feb. 7, 1995

[54] RESIN COMPOSITION OF POLYAMIDEIMIDE AND POLYPHENYLENE SULFIDE

[75] Inventors: Takao Kawaki; Akikazu Amagai, both of Tokyo; Toshiaki Yamada, Tsukuba; Hidefumi Harada, Tsukuba; Hajime Ban, Tsukuba, all of Japan

[73] Assignee: Mitsubishi Gas Chemical Company, Inc., Tokyo, Japan

[21] Appl. No.: 124,642

[22] Filed: Sep. 22, 1993

[30] Foreign Application Priority Data

Sep. 22, 1992 [JP] Japan .................. 4-252848

[51] Int. Cl.⁶ ................ C08L 81/04; C08L 79/08
[52] U.S. Cl. .................. 525/419; 525/420; 525/452; 525/537
[58] Field of Search ............ 525/452, 537, 419

[56] References Cited

U.S. PATENT DOCUMENTS

| | | | |
|---|---|---|---|
| 4,387,192 | 6/1983 | Yonezawa et al. | 525/426 |
| 5,149,749 | 9/1992 | Blackwell et al. | 525/537 |
| 5,157,085 | 10/1992 | Ohta et al. | 525/432 |

FOREIGN PATENT DOCUMENTS

| | | |
|---|---|---|
| 0241019 | 10/1987 | European Pat. Off. . |
| 0492947 | 7/1992 | European Pat. Off. . |
| 44-19274 | 8/1969 | Japan . |
| 57-9754 | 2/1982 | Japan . |

OTHER PUBLICATIONS

Patent Abstracts of Japan, vol. 16, No. 584 (c-1013) (5627) Dec. 24, 1992 (JP-A-04236263).

*Primary Examiner*—Ana L. Carrillo
*Attorney, Agent, or Firm*—Wenderoth, Lind & Ponack

[57] ABSTRACT

A resin composition comprising a melt-kneaded product of (A) an aromatic polyamideimide resin (Component A) which is obtained by polymerizing an aromatic tricarboxylic acid anhydride and a diisocyanate in a solvent under conditions where an amide group is substantially formed first and then an imide group is formed, and which has at least one recurring unit of the formula (1),

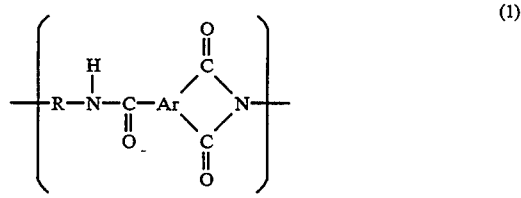

wherein Ar is a trivalent aromatic hydrocarbon group having at least one 6-membered carbon ring, and R is a divalent aromatic hydrocarbon group or an aliphatic hydrocarbon group, and (B) a polyphenylene sulfide resin (Component B); and the molded article obtained by molding said resin composition.

8 Claims, No Drawings

RESIN COMPOSITION OF POLYAMIDEIMIDE AND POLYPHENYLENE SULFIDE

FIELD OF THE INVENTION

The present invention relates to a resin composition consisting essentially of an aromatic polyamideimide resin and a polyphenylene sulfide resin. More specifically, it relates to a novel resin composition consisting essentially of an aromatic polyamideimide resin obtained by a specific method and a polyphenylene sulfide resin and having excellent heat resistance, excellent flowability at melting (hereinafter to be referred to simply as "flowability") and excellent residence stability.

PRIOR ART

Aromatic polyamideimide resins are plastic materials excellent in heat resistance, mechanical strength, electrical properties and chemical resistance. However, since most of polyamideimide resins are poor in flowability and hard to mold by injection molding, it is general practice at present to employ a compression molding method, unless they are used in varnishes or as materials for films. Further, an aromatic polyamideimide resin has been produced by a method in which (a) a combination of an aromatic tricarboxylic acid anhydride and diisocyanate, (b) a combination of an aromatic tricarboxylic acid anhydride and diamine or (c) a combination of an aromatic tricarboxylic acid anhydride halide and diamine is polymerized in a solvent. In the above method (a) using aromatic tricarboxylic acid anhydride and diisocyanate as raw materials (to be sometimes referred to as "isocyanate method" hereinafter), a polyamideimide structure is formed directly from the polymerization reaction. Meanwhile, in the above methods (b) and (c), a polyamideimide precursor having an amic acid structure is formed by the polymerization reaction and for converting the precursor to an amideimide structure, it is therefore required to carry out a dehydration post-treatment step for ring-closing the amic acid structure to an imide ring at a high temperature for a long period of time. Further, in this post-treatment step, gelation may take place and it may impair the flowability. When the ring closing is insufficient, water generates at molding, and it causes foaming which impairs the quality of a molded article. Moreover, the method (c) uses aromatic tricarboxylic acid anhydride halide and diamine as raw materials. In the method (c), therefore, halogen residues remain in a polyamideimide resin, and such a polyamideimide resin is unsuitable for recent electronic and electric products.

As is clear from the above, an aromatic polyamideimide resin suitable for molding is mostly prepared by the diisocyanate method (method (a)) in which aromatic tricarboxylic acid anhydride and diisocyanate are polymerized. However, aromatic polyamideimide resins which are produced from aromatic tricarboxylic acid anhydrides and diisocynates by conventional techniques typified by the method described in Japanese Patent Publication No. 19274/1969, are still inferior in melt moldability and are hence unsuitable for melt molding. That is, the aromatic polyamideimide resins are poor in flowability, and most of them are hard to mold by an injection molding method and are actually molded by a compression molding method as described above.

On the other hand, the characteristic feature of a polyphenylene sulfide resin is that it is excellent in heat resistance, electric properties and solvent resistance, particularly excellent in flowability. However, it is inferior in oxidation resistance at melting, and when it resides in a molten state at a relatively high temperature, it undergoes gelation. The gelation greatly decreases the flowability, and in the worst case makes it difficult to mold the polyphenylene sulfide resin.

For improving the flowability of an aromatic polyamideimide resin, for example, Japanese Patent Publication No. 9754/1982 discloses a resin composition containing a polyamideimide resin and a polyphenylene sulfide resin.

The above Publication describes that a resin obtained by any one of the above-described methods may be used as the aromatic polyamideimide resin, while it describes nothing concerning the influence which the method for the production of the aromatic polyamideimide resin has on the physical properties of the resin composition. The resin composition disclosed in the above Publication retains the high heat resistance of the aromatic polyamideimide resin. However, the excellent flowability of the polyphenylene sulfide resin is hardly reflected due to the inferior flowability of the aromatic polyamideimide resin, and the flowability of the composition is not yet sufficient and remains to be improved. Further, for melt-processing the composition containing an aromatic polyamideimide resin and a polyphenylene sulfide resin, generally, it is required to set the processing temperature at a higher level than the temperature for processing the polyphenylene sulfide resin alone, since the aromatic polyamideimide has a high glass transition temperature as high as about 300° C. For this reason, this composition has a problem in that the polyphenylene sulfide resin has low residence stability at high-temperature melting. In the worst case, the flowability greatly decreases due to a prolonged residence, and it is sometimes difficult to mold the composition stably by means of a molding machine for ordinary plastic materials. As is clear from the above discussion on the prior art as to a conventional resin composition containing an aromatic polyamideimide resin and a polyphenylene sulfide resin, there has not yet been developed any material which is well-balanced among heat resistance, flowability at melting and residence stability.

On the other hand, European Patent Publication No. 0492947A1 discloses a heat-resistant resin composition comprising a melt-kneaded product from the following (A), (B) and (C) components, (A) an aromatic polyamideimide resin and/or its precursor, (B) a polyphenylene sulfide resin, and (C) an organic polyisocyanate compound.

The above European Patent Publication describes that the above aromatic polyamideimide resin (A) can be produced by any one of the methods (a) and (c). However, the method (a) using an aromatic tricarboxylic acid anhydride and diisocyanate specifically refers to a conventionally known method (e.g., the method disclosed in the said Japanese Patent Publication No. 19274/1969). As described above, the aromatic polyamideimide resin obtained by this method is poor in flowability and unsatisfactory in residence stability. The moldability of the above resin composition is therefore suitable only under certain limited compositions and conditions.

SUMMARY OF THE INVENTION

It is therefore a first object of the present invention to provide a resin composition which comprises an aromatic polyamideimide resin and a polyphenylene sulfide resin and has excellent flowability when melted.

It is a second object of the present invention to provide a resin composition which comprises an aromatic polyamideimide resin and a polyphenylene sulfide resin and has excellent residence stability when melted under heat.

The above "residence stability" means that the rate of the decrease in the flowability of a resin composition in a molten state with time is small.

It is another object of the present invention to provide the above composition which gives a molded article having excellent heat resistance.

It is further another object of the present invention to provide the above composition which has improved moldability.

According to the present invention, the above objects and advantages of the present invention are achieved by a resin composition comprising a melt-kneaded product of:

(A) an aromatic polyamideimide resin (Component A) which is obtained by polymerizing an aromatic tricarboxylic acid anhydride and a diisocyanate in a solvent under conditions where an amide group is substantially formed first and then an imide group is formed, and which has at least one recurring unit of the formula (1),

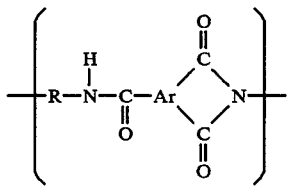

wherein Ar is a trivalent aromatic hydrocarbon group having at least one 6-membered carbon ring, and R is a divalent aromatic hydrocarbon group or an aliphatic hydrocarbon group, and (B) a polyphenylene sulfide resin (Component B).

DETAILED DESCRIPTION OF THE INVENTION

The present invention will be detailed hereinafter.

I Aromatic polyamideimide resin (Component A)

The resin composition of the present invention has one of its characteristic features in that an aromatic polyamideimide resin which is produced by a specific method and which has at least one recurring unit of the above formula (1) is used as the aromatic polyamideimide resin (Component A), one of the two essential components.

The aromatic polyamideimide resin (Component A) is produced by the following two steps: (i) the step of first reacting an aromatic tricarboxylic acid anhydride and a diisocyanate, which are the main starting materials, in a solvent under conditions where an amide group is substantially formed (first step) and (ii) the subsequent step of reacting the aromatic tricarboxylic acid anhydride and the diisocyanate in the solvent under conditions where an imide group is formed (second step).

In the first step a reaction for forming an amide group by reacting a free carboxyl group with an isocyanate group is substantially carried out, and in the second step a reaction for forming an imide group by reacting an acid anhydride group with an isocyanate group is substantially carried out. That is, in the first step, an aromatic tricarboxylic acid anhydride and a diisocyanate are allowed to react under conditions where the above reaction for forming an amide group proceeds but the reaction for forming an imide group substantially does not take place.

The above process for producing an aromatic polyamideimide resin is a novel process that the present inventors have found, and an aromatic polyamideimide resin having excellent flowability can be obtained by this method.

According to the present invention, therefore, there is provided an aromatic polyamideimide resin (Component A) having at least one recurring unit of the formula (1),

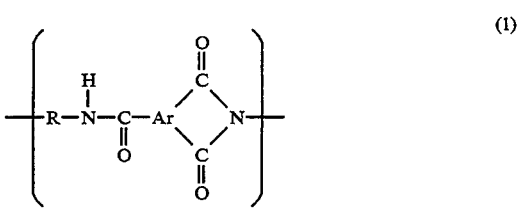

wherein Ar is a trivalent aromatic hydrocarbon group having at least one 6-membered carbon ring, and R is a divalent aromatic hydrocarbon group or an aliphatic hydrocarbon group, which is obtained by polymerizing an aromatic tricarboxylic acid anhydride and a diisocyanate in a solvent under conditions where an amide group is substantially formed first and then an imide group is formed.

Specifically, the above aromatic polyamideimide resin can be produced by optimizing the reaction conditions such as reaction temperature, reaction time and use of a catalyst in each of the first and second steps. Basically, in the first step, an amide group is formed under conditions where a reaction for forming an imide group substantially does not take place until the formation of the amide group is substantially completed, and in the second step, an imide group is formed. For suppressing the formation of an imide group until the substantial completion of the formation of an amide in the first step, it is necessary to trace the formation of an amide group and the formation of an imide group during the polymerization, and the tracing can be carried out by any one of known methods such as infrared spectroscopy and gas chromatography.

At the time when the reaction for forming an imide group in the second step is initiated, the completion rate of the reaction for forming an amide group is at least 70%, preferably at least 80%, more preferably at least 90%, most preferably at least 95%. On the other hand, the initiation rate of the reaction for forming an imide group at the above-specified stage is preferably limited to 5% or less, more preferably limited to 3% or less.

The reaction temperature is one of the important conditions, and it is preferred to control the reaction temperature for producing the aromatic polyamideimide resin (Component A) used in the resin composition of the present invention. Studies by the present inventors have revealed the following: When the polymerization is carried out by setting the reaction temperature in the first step between 50° C. and 100° C. and the reaction temperature in the second step between 100° and 200° C., an amide group is substantially formed and thereafter an imide group is formed, whereby the aromatic polyamideimide resin used in the resin composition of the present invention can be produced with ease. The temperature in each step may be freely set in the above corresponding range. For example, the temperature in each step may be increased, may be set at a constant temperature, or may be increased stepwise, so long as it is within the above corresponding temperature range. However, it is preferred to set the above temperature at a constant temperature. For producing the aromatic polyamideimide resin suitable for use in the resin composition of the present invention, the temperature in the first step is preferably between 60° C. and 100° C., more preferably between 80° C. and 100° C., and the temperature in the second step is preferably between 105° C. and 180° C., more preferably between 110° C. and 130° C. When the temperature in any one of the two steps is lower than the lower limit of the corresponding temperature range, the reaction for forming an amide group or an imide group is not completed and consequently, the resultant polyamideimide has an insufficient polymerization degree and is fragile. When the temperature in the first step is higher than the above upper limit, the reaction for forming an amide group and the reaction for forming an imide group concurrently proceed, and a resin composition containing such a polyamideimide resin has poor flowability and residence stability.

The reaction time in the first step is generally 30 minutes to 5 hours, preferably 30 minutes to 2 hours, and the reaction time in the second step is generally 30 minutes to 10 hours, preferably 1 hour to 8 hours. When the reaction time in any of the two steps is smaller than the above corresponding range, the polymerization degree is insufficient. When the reaction time in any one of the two steps is larger than the above corresponding range, a resin composition containing the so-obtained polyamideimide resin is inferior in flowability and residence stability.

The aromatic polyamideimide resin (Component A) can be also effectively produced by another method using a catalyst, i.e., a method in which the reaction for forming an amide group is carried out in the absence of a catalyst or in the presence of a small amount of a catalyst or a weak basic catalyst under temperature conditions where the reaction for forming an imide group does not take place until the completion of the formation of an amide group, and then a catalyst is added or additionally added or a strong basic catalyst is newly added. For this purpose, there may be used a variety of catalysts described in prior art literatures, although it is required to limit the amount of the catalyst to a necessary minimum value not to impair the flowability and residence stability of the resin composition of the present invention. However, it is preferred to use no catalyst so long as the reaction for forming an amide group and the reaction for forming an imide group can be fully distinguished and so long as the polymerization rate is at a practically sufficient level.

Examples of the catalyst which may be used optionally include tertiary amines such as pyridine, quinoline, isoquinoline, trimethylamine, triethylamine, tributylamine, N,N-diethylamine, γ-picoline, N-methylmorpholine, N-ethylmorpholine, triethylenediamine and 1,8-diazabicyclo[5,4,0]undecene-7; and weakly acidic metal salts, heavy metal salts and alkali metal salts such as cobalt acetate, cobalt naphthenate and sodium oleate.

The aromatic tricarboxylic acid anhydride used for producing the aromatic polyamideimide resin (Component A) for use in the resin composition of the present invention has the following formula (2).

wherein Ar is a trivalent aromatic hydrocarbon group having at least one 6-membered carbon ring.

The trivalent aromatic hydrocarbon group for Ar in the formulae (1) and (2) is preferably an aromatic hydrocarbon group having 1 or 2 benzene rings. Examples of the above trivalent aromatic hydrocarbon group include the following.

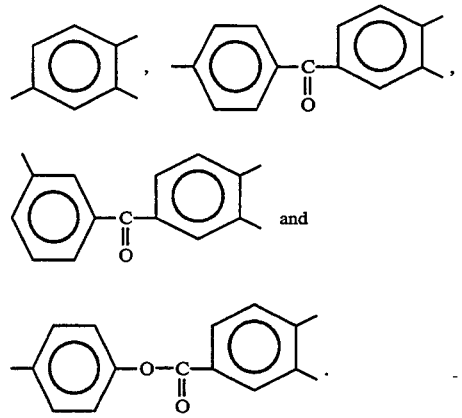

Of the above hydrocarbons, preferred is an aromatic hydrocarbon group derived from trimellitic anhydride as shown below.

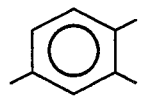

The diisocyanate used for producing the aromatic polyamideimide resin (Component A) for use in the resin composition of the present invention has the following formula (3).

O=C=N—R—N=C=O        (3)

wherein R is a divalent aromatic or aliphatic hydrocarbon group, preferably a divalent aromatic or aliphatic hydrocarbon group having 15 carbon atoms or less.

Specific examples of the above divalent aromatic or aliphatic hydrocarbon group are as follows.

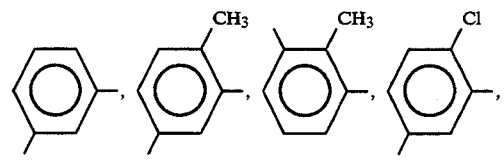

-continued
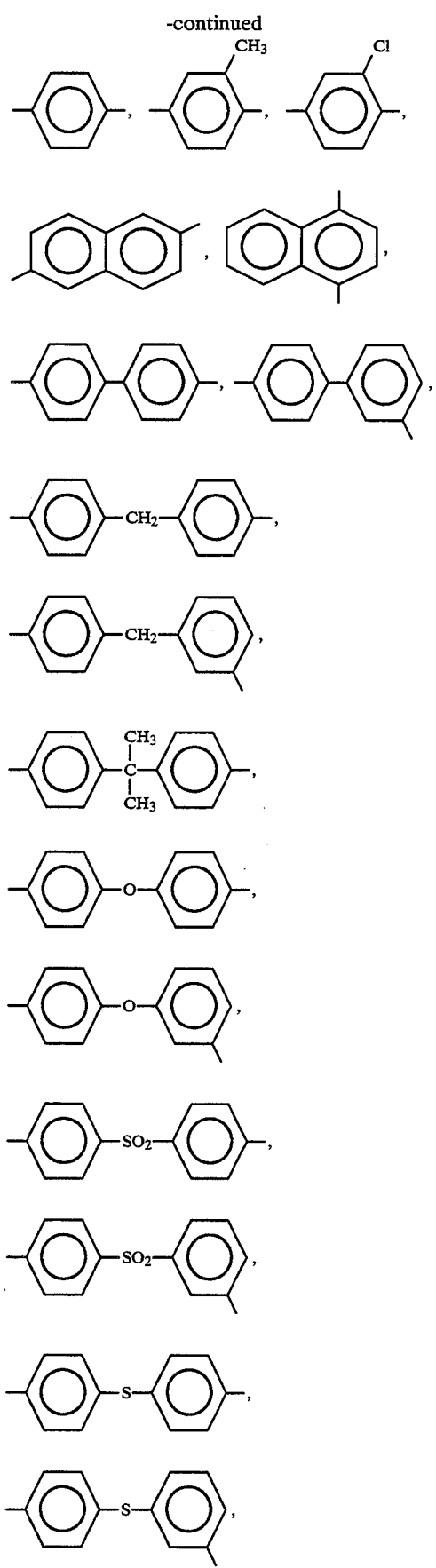
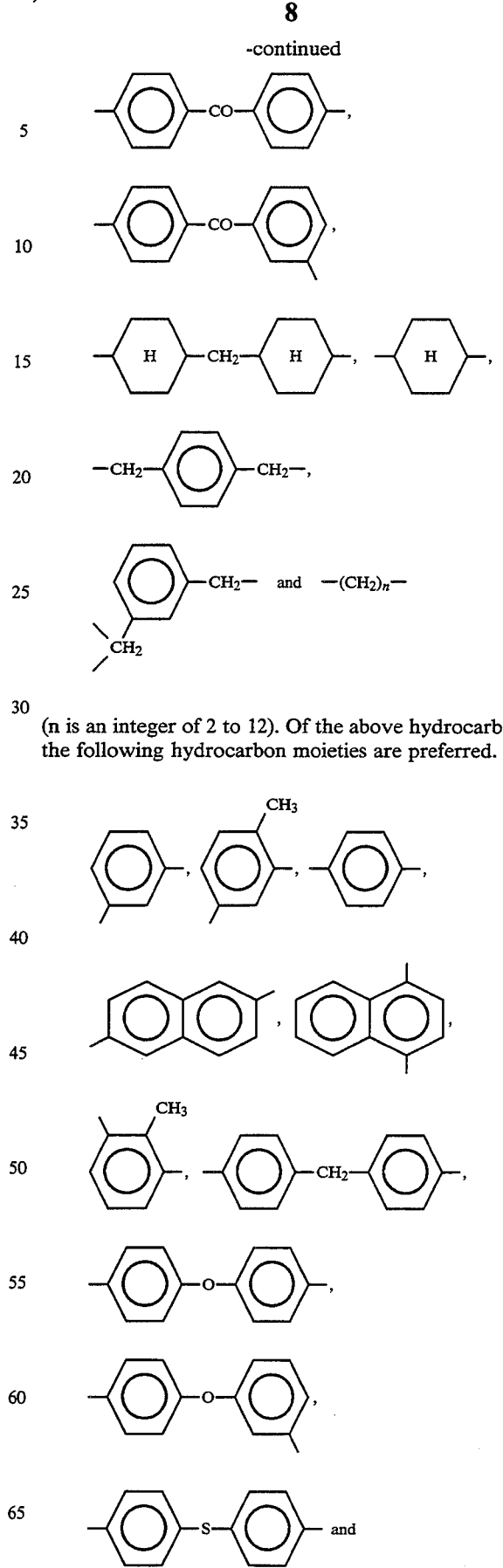
(n is an integer of 2 to 12). Of the above hydrocarbons, the following hydrocarbon moieties are preferred.

-continued

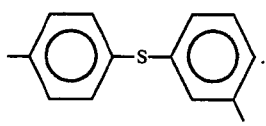

The following hydrocarbon moieties are more preferred. The content of at least one of these is at least 70 mol %, preferably at least 80 mol % when the total content of R is 100 mol %.

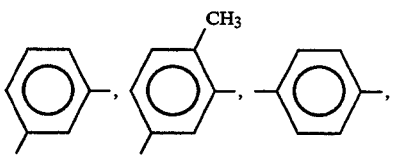

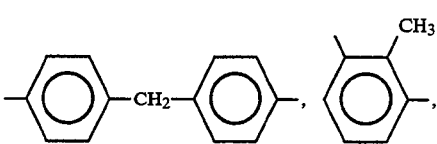

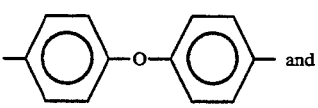 and

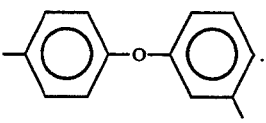

The following hydrocarbon moieties are the most preferred. The content of at least one of these is at least 70 mol %, preferably at least 80 mol % when the total content of R is 100 mol %.

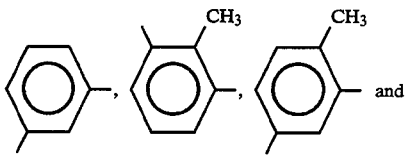 and

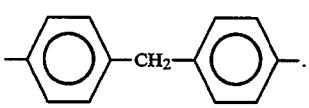

In the production of the aromatic polyamideimide resin (Component A) used in the resin composition of the present invention, less than 50 mol %, preferably less than 30 mol % of the aromatic tricarboxylic acid anhydride may be replaced with a dicarboxylic acid of the formula (4) or an aromatic tetracarboxylic acid dianhydride of the formula (5). The dicarboxylic acid is preferred.

$$\text{HO}-\overset{\overset{\text{O}}{\|}}{\text{C}}-\text{R}'-\overset{\overset{\text{O}}{\|}}{\text{C}}-\text{OH} \quad (4)$$

wherein R' is a divalent aromatic or aliphatic hydrocarbon group.

Specific examples of the above divalent aromatic or aliphatic hydrocarbon group are as described concerning R in the diisocyanate of the formula (3). Of these, the following hydrocarbon moieties are preferred.

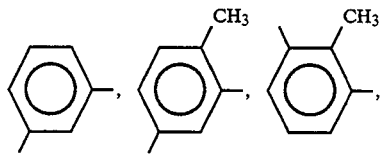

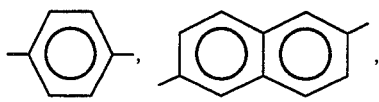

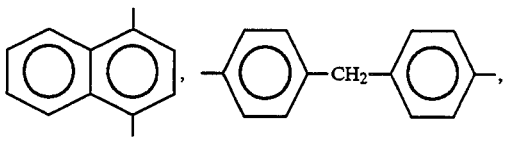

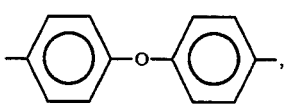

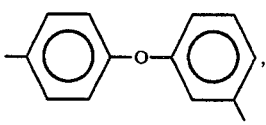

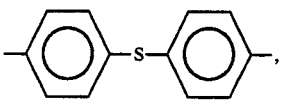

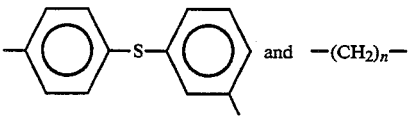

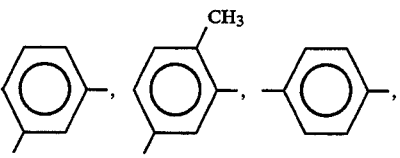 and $-(CH_2)_n-$ ($n$ is an integer of 2 to 12).

Particularly preferred as R' are the following hydrocarbon moieties.

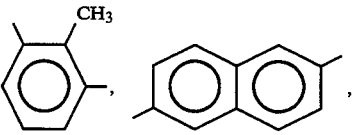

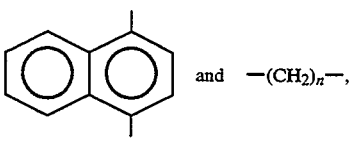 and $-(CH_2)_n-$, (n is an integer of 2 to 12).

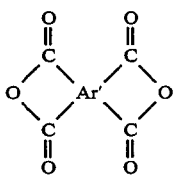
(5)

In the above formula (5), Ar' is a tetravalent aromatic hydrocarbon group having at least one 6-membered carbon ring.

Ar' is preferably selected from aromatic hydrocarbons having at least two benzene rings. Specific examples of the tetravalent aromatic hydrocarbon group are as follows.

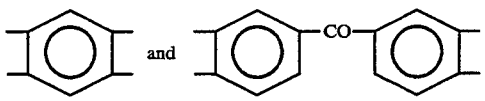

The polyamideimide resin may contain a plurality of structural units containing different hydrocarbon moieties corresponding to At, R, R' or Ar' as structural units derived from the compounds of the formula (2), (3), (4) or (5). That is, the polyamideimide resin used in the present invention may be in the form of a variety of copolymers.

The solvent used for the production of the aromatic polyamideimide resin for use in the resin composition of the present invention is selected from polar solvents which are or are not compatible with the polyamideimide resin to be formed. Specific examples of the polar solvent compatible with the polyamideimide include N-methylpyrrolidone, dimethylformamide, dimethylacetamide, dimethylsulfoxide, dimethylsulfolane, tetramethylenesulfone, diphenylsulfone and γ-butyrolactone. Specific examples of the polar solvent incompatible with the polyamideimide resin include nitrobenzene, nitrotoluene, acetonitrile, benzonitrile, acetophenone, nitromethane, dichlorobenzene and anisole. The above solvents may be used alone or in combination. The above polar solvents compatible with the polyamideimide resin are preferred. The solvent is used in such an amount that the amount of the monomers per liter of the solvent is 0.1 to 3 mol.

In the production of the aromatic polyamideimide resin for use in the resin composition of the present invention, the water content in the reaction system comprising the solvent, monomers, etc., is maintained preferably at 500 ppm or less, more preferably at 100 ppm or less, most preferably at 50 ppm or less. When the above water content in the system is larger than the above upper limit, the flowability and residence stability of the resin composition of the present invention are impaired.

For producing the aromatic polyamideimide resin suitable for use in the resin composition of the present invention, the molar ratio between the aromatic tricarboxylic acid anhydride (including the above dicarboxylic acid and tetracarboxylic acid dianhydride: molar amount=X) and the diisocyanate (molar amount=Y) is preferably maintained at $0.9 < X/Y < 1.1$, more preferably at $0.99 < X/Y < 1.01$.

In producing the aromatic polyamideimide resin for use in the resin composition of the present invention, a small amount of a molecular weight adjuster may be used. Typical examples of the molecular weight adjuster include monocarboxylic acids such as benzoic acid; dicarboxylic acid anhydrides such as phthalic anhydride, succinic anhydride and naphthalenedicarboxylic acid anhydride; monoisocyanates such as phenylisocyanate; and monofunctional compounds such as phenols.

When the polymerization degree of the aromatic polyamideimide resin used in the resin composition of the present invention is expressed in terms of a reduced viscosity measured in dimethylformamide at 30° C. at a concentration of 1 g/dl, the reduced viscosity is preferably 0.15 dl/g to 1.0 dl/g, more preferably 0.2 dl/g to 0.6 dl/g, most preferably 0.2 dl/g to 0.5 dl/g.

The aromatic polyamideimide resin provided by the present invention is recovered in the form of a powder by precipitating it in a solvent and washing it. The solvent includes alcohols such as methanol and isopropanol, ketones such as acetone and methyl ethyl ketone, and aliphatic and aromatic hydrocarbons such as heptane and toluene. As an alternative method, the aromatic polyamideimide resin may be directly recovered by concentration of the solvent used for the polymerization. Further, it is also effective to employ a method in which the solvent is concentrated to some extent and then removed under reduced pressure with an extruder, and the aromatic polyamideimide resin is pelletized.

II Polyphenylene sulfide resin (Component B)

The polyphenylene sulfide resin used as Component B in the resin composition of the present invention is a polymer containing preferably at least 70 mol %, more preferably at least 90 mol %, most preferably substantially 100 mol %, of a recurring unit of the formula (6).

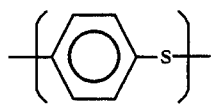
(6)

When the content of the above recurring unit in the polyphenylene sulfide resin is less than 70 mol %, it is difficult to obtain the resin composition of the present invention having the advantages described already. The above polyphenylene sulfide resin can be obtained by various known methods, while it is preferred to use a method in which sodium sulfide and p-dichlorobenzene are allowed to react in a solvent selected from amide-containing solvents such as N-methylpyrrolidone and dimethylacetamide and sulfone-containing solvents such as sulfolane. For adjusting the polymerization degree, it is preferred to add an alkali metal carboxylate such as sodium acetate or lithium acetate.

The polyphenylene sulfide resin may contain other copolymer unit in such an amount that the crystallizabllity of the polymer is not affected. The other copolymer unit includes a meta bond, ether bond, sulfone bond, biphenyl bond, amino group-substituted phenylsulfide bond, carboxyl group-substituted phenylsulfide bond, alkyl, nitro, phenyl or alkoxy group-substituted phenylsulfide bond and trivalent phenylsulfide bond. The content of the other copolymer unit is less than 30 mol %, preferably less than 10 mol %.

Further, as the polyphenylene sulfide resin (Component B), there may be also used a polyphenylene sulfide resin whose SH terminal group concentration is adjusted. Under some compositional and kneading conditions, a polyphenylene sulfide having an SH terminal group concentration of 10 mg or more equivalent weights per 1 kg of the resin sometimes gives a favorable effect, and that having an SH terminal group concentration of 20 mg or more equivalent weights gives a more favorable effect. Such polyphenylene sulfide can be produced by a variety of known polymerization methods. For example, the SH group can be easily introduced to the terminal(s) of the polyphenylene sulfide resin by treating the polyphenylene sulfide resin with hydrochloric acid or acetic acid at a final stage of the polyphenylene sulfide resin production or by treating the purified polyphenylene sulfide resin with a solvent such as hydrochloric acid, acetic acid or acetone.

III Resin composition

The resin composition of the present invention can be obtained by melt-kneading the above aromatic polyamideimide resin (Component A) and the above polyphenylene sulfide resin (Component B).

In the resin composition of the present invention, per 100% by weight of the total amount of Components A and B, the amount of Component A is 5 to 95% by weight, preferably 20 to 70% by weight, more preferably 20 to 65% by weight, and the amount of Component B is 5 to 95% by weight, preferably 30 to 80% by weight, more preferably 35 to 80% by weight. When the amount of Component A exceeds the above upper limit, the flowability decreases. When this amount is smaller than the above lower limit, the heat resistance decreases.

The resin composition of the present invention is produced by melt-kneading Components A and B by means of an extruder, a kneader, a Banbury mixer or a roll. The temperature for the melt-kneading is 250 to 400° C., preferably 300° to 380° C.

The resin composition of the present invention may contain various additives such as a filler, a pigment, a compatibilizer, a lubricant, a plasticizer, an ultraviolet absorbent, a flame retardant and a flame retardant aid; other resin; and an elastomer as required.

The filler includes mineral fillers such as glass beads, wollastonite, mica, talc, clay, asbestos, calcium carbonate, magnesium hydroxide, silica, diatomaceous earth, graphite, carborundum and molybdenum disulfide; inorganic fibers such as a glass fiber, a milled fiber, a boron fiber, a silicon carbide fiber, and fibers of metals such as brass, aluminum and zinc; organic fibers typified by a carbon fiber and an aramid fiber; and flakes of aluminum and zinc. The amount of the filler is preferably 1 to 50% by weight based on the total weight of the resin composition.

Preferred are milled fibers and glass fibers, and milled fibers and glass fibers treated with an epoxy- or amino-containing silane coupling agent can be also preferably used.

The pigment includes titanium oxide, zinc sulfide and zinc oxide.

The compatibilizer is used for improving the compatibility between the aromatic polyamideimide resin and the polyphenylene sulfide resin. Typical examples include aromatic polyisocyanates such as 2,4-tolylene diisocyanate, 2,6-tolylene diisocyanate, 1,3-phenylene diisocyanate, 1,4-phenylene diisocyanate, 4,4'-diphenylmethane diisocyanate, 4,4'-biphenyl diisocyanate, 4,4'-diphenyl ether diisocyanate and triphenylmethane triisocyanate; aliphatic polyisocyanates such as hexamethylene diisocyanate and m-xylylene diisocyanate; thioisocyanates corresponding to the above polyisocyanates; polyisocyanate compounds such as polyhydric alcohol adducts, water adducts, amine adducts or isocyanurate modified products of the above aromatic or aliphatic polyisocyanates; diglycidyl ethers of bisphenols such as bisphenol A, resorcin, hydroquinone and catecohol; epoxy group-containing compounds such as an epoxy resin, a novolak type epoxy resin, epoxidized polyolefin and epoxidized soybean oil.

The lubricant typically includes metal salts such as sodium stearate, lithium stearate, sodium montanate, lithium montanate, zinc montanate; and montanic acid amide or ester.

The flame retardant includes phosphate esters such as triphenyl phosphate and tricresyl phosphate; brominated compounds such as decabromobiphenyl, pentabromotoluene, decabromobiphenyl ether, hexabromobenzene and brominated polystyrene; nitrogen-containing compounds such as melamine derivatives; and nitrogen-containing phosphor compounds such as a cyclic phosphagen compound and a phosphagen polymer.

The flame retardant aid includes antimony, boron, zinc and iron compounds.

The other additives include stabilizers such as phenols having steric hindrance and phosphite compounds; and ultraviolet absorbents such as oxalic acid diamide compounds and amine compounds having steric hindrance.

The other resin includes aliphatic and aromatic crystalline or noncrystalline polyamides such as nylon-6, nylon-10, nylon-12, nylon-6,6, nylon-MXD,6, nylon-4,6, nylon-6,T and nylon 6,I; aliphatic and aromatic polyesters such as polyethylene terephthalate, polybutylene terephthalate and acrylate; a liquid crystal polymer obtained by the polymerization of a monomer such as p-hydroxybenzoic acid, 2,6-napthalenedicarboxylic acid, isophthalic acid, terephthalic acid, hydroquinone or dihydroxy diphenyl ether; polycarbonate obtained by using a bisphenol A; polyphenylene ether obtained by the oxidation and coupling polymerization of 2,6-dimethylphenol; and aromatic resins such as polysulfone, polyether sulfone, polyetherimide, polythioether ketone, polyether ketone and polyether ether ketone.

The elastomer includes polysulfide rubber, polyester elastomer, polyamide elastomer, polyesteramide elastomer and silicon rubber.

The resin composition of the present invention is excellent in heat resistance, flowability and residence stability and gives molded articles excellent in mechanical strength. In particular, the excellent residence stability of the resin composition of the present invention is derived from the low residence stability of the polyphenylene sulfide resin, and this improvement is an unexpected result. That is, the above excellent physical properties have been attained for the first time by combining the above polyphenylene sulfide resin with the above aromatic polyamideimide resin obtained by the polymerization of an aromatic tricarboxylic acid anhydride and a diisocyanate in a solvent under conditions where the reaction for forming an imide group is carried out after the completion of the substantial formation of an amide group.

EXAMPLES

The present invention will be further explained in detail hereinafter with reference to Examples.

Example 1

3 Liters of N-methylpyrrolidone having a water content of 15 ppm was charged into a 5-liter reactor having a stirrer, a thermometer and a reflux condenser equipped with a drying tube whose top is filled with calcium chloride. Then, 555 g (50 mol %) of trimellitic anhydride and 503 g (50 mol %; 100 mol % as isocyanate group) of 2,4-tolylene diisocyanate were added. When the trimellitic anhydride was added, the reaction system had a water content of 30 ppm. At first, the temperature of the contents was increased from room temperature to 90° C. over 20 minutes, and while the polymerization proceeded at this temperature, the amount of decreased isocyanate group of the 2,4-tolylene diisocyanate and the amount of imide group formed were measured by a method in which a small amount of the reaction mixture was sampled using a syringe, and measured for absorption at 2,276 cm$^{-1}$ to determine the amount of isocyanate group and absorption at 1,780 cm$^{-1}$ to determine the amount of imide group by an infrared spectroscopic analysis. When the polymerization proceeded for 50 minutes, the amount of isocyanate group decreased to 50 mol %. At this time, no absorption by imide group was observed, which showed that the amidation finished before the initiation of the imidation. Thereafter, the temperature of the reaction mixture was increased up to 115° C. over 10 minutes. While this temperature was maintained, the polymerization was continued for 4 hours. At this time, the absorption by isocyanate group terminated, and a theoretical amount of absorption by imide group was observed. After the polymerization finished, the polymer solution was diluted two times with N-methylpyrrolidone, and with vigorously stirring, the mixture was added to methanol whose volume was twice as large as that of the N-methylpyrrolidone. The precipitated polymer was recovered by suction filtration and fully washed by redispersing it in methanol. The polymer was recovered by filtration and dried at 200° C. under reduced pressure to give a polyamideimide resin. The polyamideimide resin was measured for a reduced viscosity in a dimethylformamide solution (concentration 1.0 g/dl) at 30° C. to show 0.25 dl/g. When the polyamideimide resin was melted under heat and press-molded, the lowest temperature for the press-molding was 380° C., and the resultant film had a tensile strength of 200 MPa.

Example 2

3 Liters of N-methylpyrrolidone having a water content of 15 ppm was charged into the same reactor as that used in Example 1. Then, 555 g of trimellitic anhydride was added and then 503 g of 2,4-tolylene diisocyanate was added. When the trimellitic anhydride was added, the reaction system had a water content of 20 ppm. At first, the temperature of the contents was increased from room temperature to 90° C. over 20 minutes, and at this temperature the polymerization was carried out for 50 minutes. At this time, the amount of isocyanate group decreased to 50 mol % and no absorption by imide group was observed. The above result showed that the amidation finished before the initiation of the imidation. Then the temperature of the reaction mixture was increased to 115° C. over 15 minutes, and while this temperature was maintained, the polymerization was continued for 8 hours. At this time, the absorption by isocyanate group terminated, and a theoretical amount of absorption by imide group was observed. After the polymerization finished, the reaction mixture was treated in the same manner as in Example 1 to give a polyamideimide powder. The polyamideimide resin powder was measured for a reduced viscosity in a dimethylformamide solution (concentration 1.0 g/dl) at 30° C. to show 0.3 dl/g.

When the above polyamideimide powder was melted under heat and press-molded, the lowest temperature for the press-molding was 380° C., and the resultant film had a tensile strength of 200 MPa.

Example 3

3 Liters of N-methylpyrrolidone having a water content of 15 ppm was charged into the same reactor as that used in Example 1. Then, 555 g of trimellitic anhydride was added and then 503 g of 2,4-tolylene diisocyanate was added. When the trimellitic anhydride was added, the reaction system had a water content of 25 ppm. At first, the temperature of the contents was increased from room temperature to 90° C. over 20 minutes, and at this temperature, the polymerization was carried out for 50 minutes. At this time, the amount of isocyanate group decreased to 50 mol % and no absorption by imide group was observed. The above results showed that the amidation finished before the initiation of the imidation. Then the temperature of the reaction mixture was increased to 125° C. over 15 minutes, and while this temperature was maintained, the polymerization was continued for 4 hours. At this time, the absorption by isocyanate group terminated, and a theoretical amount of absorption by imide group was observed. After the polymerization finished, the reaction mixture was treated in the same manner as in Example 1 to give a polyamideimide powder. The polyamideimide resin powder was measured for a reduced viscosity in a dimethylformamide solution (concentration 1.0 g/dl) at 30° C. to show 0.3 dl/g.

When the above polyamideimide powder was melted under heat and press-molded, the lowest temperature for the press-molding was 380° C., and the resultant film had a tensile strength of 200 MPa.

Example 4

3 Liters of N-methylpyrrolidone having a water content of 10 ppm was charged into the same reactor as that used in Example 1. Then, 555 g of trimellitic anhydride was added and then 503 g of 2,4-tolylene diisocyanate was added. When the trimellitic anhydride was added, the reaction system had a water content of 20 ppm. At first, the temperature of the contents was increased from room temperature to 90° C. over 20 minutes, and at this temperature the polymerization was carried out for 40 minutes. At this time, the amount of isocyanate group decreased to 40 mol % and no absorption by imide group was observed. The above results showed that the amidation rate was 80%. Then the temperature of the reaction mixture was increased to 115° C. over 5 minutes. Ten minutes after the initiation of the temperature increase, the amidation rate reached 100%, while the absorption by imide group was observed as soon as the temperature reached 115° C. While this temperature was maintained, the polymerization was continued for 4 hours. At this time, the absorption by isocyanate group terminated, and a theoretical amount of absorption by imide group was observed. After the polymerization finished, the reaction mixture was treated in the same manner as in Example 1 to give a polyamideimide powder. The polyamideimide resin powder was measured for a reduced viscosity in a dimethylformamide solution (concentration 1.0 g/dl) at 30° C. to show 0.25 dl/g.

When the above polyamideimide powder was melted under heat and press-molded, the lowest temperature for the press-molding was 390° C., and the resultant film had a tensile strength of 180 MPa.

Example 5

3 Liters of N-methylpyrrolidone having a water content of 10 ppm was charged into the same reactor as that used in Example 1. Then, 555 g (50 mol %) of trimellitic anhydride was added and then 723.3 g (50 mol %, 100 mol % as isocyanate group) of diphenylmethane diisocyanate was added. When the trimellitic anhydride was added, the reaction system had a water content of 20 ppm. At first, the temperature of the contents was increased from room temperature to 90° C. over 20 minutes, and at this temperature the polymerization was carried out for 50 minutes. At this time, the amount of isocyanate group decreased to 50 mol % and no absorption by imide group was observed. The above results showed that the amidation finished before the initiation of the imidation. Then the temperature of the reaction mixture was increased to 115° C. over 10 minutes, and while this temperature was maintained, the polymerization was continued for 4 hours. At this time, the absorption by isocyanate group terminated, and a theoretical amount of absorption by imide group was observed. After the polymerization finished, the reaction mixture was treated in the same manner as in Example 1 to give a polyamideimide powder. The polyamideimide resin powder was measured for a reduced viscosity in a dimethylformamide solution (concentration 1.0 g/dl) at 30° C. to show 0.45 dl/g.

When the above polyamideimide powder was melted under heat and press-molded, the lowest temperature for the press-molding was 350° C., and the resultant film had a tensile strength of 180 MPa.

Example 6

3 Liters of N-methylpyrrolidone having a water content of 10 ppm was charged into the same reactor as that used in Example 1. Then, 277.6 g (25 mol %) of trimellitic anhydride was added, then 240.1 g (25 mol %) of isophthalic acid was added and then, 503 g (50 mol %, 100 mol % as isocyanate group) of 2,4-tolylene diisocyanate was added. When the trimellitic anhydride and isophthalic acid were added, the reaction system had a water content of 25 ppm. At first, the temperature of the contents was increased from room temperature to 90° C. over 20 minutes, and at this temperature the polymerization was carried out for 90 minutes. At this time, the amount of isocyanate group decreased to 25 mol % and no absorption by imide group was observed. The above results showed that the amidation finished before the initiation of the imidation. Then the temperature of the reaction mixture was temperature-increased to 125° C. over 15 minutes, and while this temperature was maintained, the polymerization was continued for 4 hours. At this time, the absorption by isocyanate group terminated, and a theoretical amount of absorption by imide group was observed. After the polymerization finished, the reaction mixture was treated in the same manner as in Example 1 to give a polyamideimide powder. The polyamideimide resin powder was measured for a reduced viscosity in a dimethylformamide solution (concentration 1.0 g/dl) at 30° C. to show 0.48 dl/g.

When the above polyamideimide powder was melted under heat and press-molded, the lowest temperature for the press-molding was 360° C., and the resultant film had a tensile strength of 190 MPa.

Example 7

3 Liters of N-methylpyrrolidone having a water content of 15 ppm was charged into the same reactor as that used in Example 1. Then, 277.6 g (25 mol %) of trimellitic anhydride was added, 144 g (15 mol %) of isophthalic acid was added, 108.8 g (10 mol %) of azelaic acid was added, and then 503 g (50 mol %, 100 mol % as isocyanate group) of 2,4-tolylene diisocyanate was added. When the trimellitic anhydride and the isophthalic acid were added, the reaction system had a water content of 50 ppm. At first, the temperature of the contents was increased from room temperature to 90° C. over 20 minutes, and at this temperature the polymerization was carried out for 90 minutes. At this time, the amount of isocyanate group decreased to 25 mol % and no absorption by imide group was observed. The above results showed that the amidation finished before the initiation of the imidation. Then the temperature of the reaction mixture was temperature-increased to 125° C. over 15 minutes, and while this temperature was maintained, the polymerization was continued for 4 hours. At this time, the absorption by isocyanate group terminated, and a theoretical amount of absorption by imide group was observed. After the polymerization finished, the reaction mixture was treated in the same manner as in Example 1 to give a polyamideimide powder. The polyamideimide resin powder was measured for a reduced viscosity in a dimethylformamide solution (concentration 1.0 g/dl) at 30° C. to show 0.48 dl/g.

When the above polyamideimide powder was melted under heat and press-molded, the lowest temperature for the press-molding was 330° C., and the resultant film had a tensile strength of 160 MPa.

Examples 8-11

One of the polyamideimide resins obtained in Example 2 and 5 to 7, a polyphenylene sulfide resin (trade name: T-4, supplied by Toprene Co., Ltd) and a glass fiber were blended in amounts shown in Table 1, and the blend was melt-kneaded at 360° C. with a twin-screw extruder to form pellets. The pellets were measured for a melt flow value at 350° C. at a stress of 60 kg. The pellets were also injection-molded to prepare transverse test pieces having a thickness of ⅛ inch. The transverse test pieces were measured for flexural strength and elastic modulus. Table 1 shows the results.

TABLE 1

| | Ex. 8 | Ex. 9 | Ex. 10 | Ex. 11 |
|---|---|---|---|---|
| COMPOSITION | | | | |
| Polyamideimide obtained in | Ex. 2 | Ex. 5 | Ex. 6 | Ex. 7 |
| Part by weight | 25 | 25 | 25 | 25 |
| Polyphenylene sulfide part by weight | 35 | 35 | 35 | 35 |
| Glass fiber part by weight | 40 | 40 | 40 | 40 |
| PHYSICAL PROPERTIES | | | | |
| Flexural strength (Mpa) | 240 | 200 | 200 | 190 |
| Elastic modulus (GPa) | 14 | 13 | 12 | 12 |
| Melt flow | 0.09 | 0.08 | 0.1 | 0.2 |

TABLE 1-continued

| | Ex. 8 | Ex. 9 | Ex. 10 | Ex. 11 |
|---|---|---|---|---|
| value 350° C. 60 kg (cc/sec) | | | | |

Ex. = Example

Comparative Example 1

3 Liters of N-methylpyrrolidone having a water content of 15 ppm was charged into the same reactor as that used in Example 1. Then, 555 g (50 mol %) of trimellitic anhydride was added and then 503 g (50 mol %, 100 mol % as isocyanate group) of 2,4-tolylene diisocyanate was added. When the trimellitic anhydride was added, the reaction system had a water content of 30 ppm. At first, the temperature of the contents was increased from room temperature to 180° C. over 30 minutes, and at this temperature, the polymerization was carried out for 3 hours. During the polymerization, the amount of reduced isocyanate and the amount of imide group formed were traced in the same manner as in Example 1. When the temperature reached 130° C., the isocyanate group decreased by 30 mol %, but a considerable amount of absorption by imide group was observed, which showed that the amidation and the imidation proceeded concurrently. After the polymerization finished, the reaction mixture was treated in the same manner as in Example 1 to give a polyamideimide powder. The polyamideimide resin powder was measured for a reduced viscosity in a dimethylformamide solution (concentration 1.0 g/dl) at 30° C. to show 0.3 dl/g.

When the above polyamideimide powder was melted under heat and press-molded, the lowest temperature for the press-molding was 430° C., and the resultant film had a tensile strength of 180 MPa.

Comparative Example 2

Comparative Example 1 was repeated except that the polymerization temperature alone was changed. That is, at first, the temperature of the contents was increased from room temperature to 115° C. over 30 minutes, and at this temperature, the polymerization was carried out for 8 hours. Ten minutes after the temperature reached 115° C., the reaction mixture was analyzed in the same as in Comparative Example 1. The isocyanate group decreased by 30 mol %, but a considerable amount of absorption by imide group was observed, which showed that the amidation and the imidation proceeded concurrently. After the polymerization finished, the reaction mixture was treated in the same manner as in Example 1 to give a polyamideimide powder. The polyamideimide resin powder was measured for a reduced viscosity in a dimethylformamide solution (concentration 1.0 g/dl) at 30° C. to show 0.24 dl/g.

When the above polyamideimide powder was melted under heat and press-molded, the lowest temperature for the press-molding was 420° C., and the resultant film had a tensile strength of 180 MPa.

Comparative Example 3

Comparative Example 1 was repeated except that the polymerization temperature alone was changed. That is, at first, the temperature of the contents was increased from room temperature to 125° C. over 30 minutes, and at this temperature, the polymerization was carried out for 4 hours. Five minutes after the temperature reached 115° C., the reaction mixture was analyzed in the same as in Comparative Example 1. The isocyanate group decreased by 30 mol %, but a considerable amount of absorption by imide group was observed, which showed that the amidation and the imidation proceeded concurrently. After the polymerization finished, the reaction mixture was treated in the same manner as in Example 1 to give a polyamideimide powder. The polyamideimide resin powder was measured for a reduced viscosity in a dimethylformamide solution (concentration 1.0 g/dl) at 30° C. to show 0.3 dl/g.

When the above polyamideimide powder was melted under heat and press-molded, the lowest temperature for the press-molding was 420° C., and the resultant film had a tensile strength of 150 MPa.

Comparative Example 4

Example 5 was repeated except that the polymerization temperatures alone were changed. That is, at first, the temperature of the contents was increased from room temperature to 125° C. over 30 minutes, and at this temperature, the polymerization was carried out for 4 hours. Ten minutes after the temperature reached 125° C., the reaction mixture was analyzed in the same as in Comparative Example 1 to show that the amidation and the imidation proceeded concurrently. After the polymerization finished, the reaction mixture was treated in the same manner as in Example 1 to give a polyamideimide powder. The polyamideimide resin powder was measured for a reduced viscosity in a dimethylformamide solution (concentration 1.0 g/dl) at 30° C. to show 0.4 dl/g.

When the above polyamideimide powder was melted under heat and press-molded, the lowest temperature for the press-molding was 400° C., and the resultant film had a tensile strength of 160 MPa.

Comparative Example 5

Example 6 was repeated except that the polymerization temperatures alone were changed. That is, at first, the temperature of the contents was increased from room temperature to 125° C. over 30 minutes, and at this temperature, the polymerization was carried out for 4 hours. Ten minutes after the temperature reached 125° C., the reaction mixture was analyzed in the same as in Comparative Example 1 to show that the amidation and the imidation proceeded concurrently. After the polymerization finished, the reaction mixture was treated in the same manner as in Example 1 to give a polyamideimide powder. The polyamideimide resin powder was measured for a reduced viscosity in a dimethylformamide solution (concentration 1.0 g/dl) at 30° C. to show 0.45 dl/g.

When the above polyamideimide powder was melted under heat and press-molded, the lowest temperature for the press-molding was 400° C., and the resultant film had a tensile strength of 140 MPa.

Comparative Example 6

Example 7 was repeated except that the polymerization temperatures alone were changed. That is, at first, the temperature of the contents was increased from room temperature to 125° C. over 30 minutes, and at this temperature, the polymerization was carried out for 4 hours. Ten minutes after the temperature reached 125° C., the reaction mixture was analyzed in the same as in Comparative Example 1 to show that the amidation and the imidation proceeded concurrently. After the polymerization finished, the reaction mixture was treated in the same manner as in Example 1 to give a polyamideimide powder. The polyamideimide resin powder was measured for a reduced viscosity in a dimethylformamide solution (concentration 1.0 g/dl) at 30° C. to show 0.43 dl/g.

When the above polyamideimide powder was melted under heat and press-molded, the lowest temperature for the press-molding was 390° C., and the resultant film had a tensile strength of 140 MPa.

Comparative Examples 7–10

One of the polyamideimide resins obtained in Comparative Examples 2 and 4 to 6, a polyphenylene sulfide resin (trade name: T-4, supplied by Toprene Co., Ltd) and a glass fiber were blended in amounts shown in Table 2, and the blend was melt-kneaded at 360° C. with a twin-screw extruder to form pellets. The pellets were measured for a melt flow value at 350° C. at a stress of 60 kg. The pellets were also injection-molded to prepare transverse test pieces having a thickness of ⅛ inch. The transverse test pieces were measured for flexural strength and elastic modulus. Table 2 shows the results.

TABLE 2

|  | CEx. 8 | CEx. 9 | CEx. 10 | CEx. 11 |
|---|---|---|---|---|
| COMPOSITION |  |  |  |  |
| Polyamideimide obtained in | CEx. 2 | CEx. 4 | CEx. 5 | CEx. 6 |
| Part by weight | 25 | 25 | 25 | 25 |
| Polyphenylene sulfide part by weight | 35 | 35 | 35 | 35 |
| Glass fiber part by weight | 40 | 40 | 40 | 40 |
| PHYSICAL PROPERTIES |  |  |  |  |
| Flexural strength (Mpa) | 190 | 180 | 180 | 160 |
| Elastic modulus (GPa) | 13 | 12 | 11 | 9 |
| Melt flow value 350° C. 60 kg (cc/sec) | 0.009 | 0.01 | 0.05 | 0.09 |

CEx. = Comparative Example

Example 12

The aromatic polyamideimide resin obtained in Example 1 and a polyphenylene sulfide resin (trade name: T-4, supplied by Toprene Co., Ltd) were blended in amounts shown in Table 3, and the blend was melt-kneaded at 360° C. and pelletized with a twin-screw extruder to give a resin composition. The pellets were injection-molded to prepare transverse test pieces having a thickness of ⅛ inch. The test piece was measured for a heat deformation temperature (18.6 kg), and the pellets were measured for a melt flow value at 350° C. at a stress of 60 kg/cm². The residence stability of the composition was evaluated as follows. The pellets were fully kneaded in a kneader (Laboplastmill, supplied by Toyo Seiki Seisakusho K. K.) at 380° C. for 15 minutes and measured for a melt flow value, and the so-obtained melt flow value was compared with a melt flow value obtained from the pellets before the kneading. Table 3 shows the results.

Comparative Example 11

Example 12 was repeated except that the aromatic polyamideimide resin was replaced with the aromatic polyamideimide resin obtained in Comparative Example 2. Table 3 shows the results.

Comparative Example 12

Example 12 was repeated except that the polyphenylene sulfide resin alone was used. Table 3 shows the results.

Example 13

The aromatic polyamideimide resin obtained in Example 1, a polyphenylene sulfide resin (trade name: T-4, supplied by Toprene Co., Ltd), 4,4'-diphenylmethane diisocyanate and zinc montanate were blended in amounts shown in Table 3, and the blend was melt-kneaded at 360° C. and pelletized with a twin-screw extruder to give a resin composition. The pellets were injection-molded to prepare ⅛ inch thick dumbbell specimens and ⅛ inch thick transverse test pieces. The test piece was measured for a heat deformation temperature (18.6 kg), and the pellets were measured for a melt flow value at 350° C. at a stress of 60 kg/cm². The residence stability of the composition was evaluated in the same manner as in Example 12. Table 3 shows the results.

Comparative Example 13

Example 13 was repeated except that the aromatic polyamideimide resin was replaced with the aromatic polyamideimide resin obtained in Comparative Example 2. Table 3 shows the results.

Example 14

Example 13 was repeated except that the aromatic polyamideimide resin was replaced with the aromatic polyamideimide resin obtained in Example 6. Table 3 shows the results.

Comparative Example 14

Example 13 was repeated except that the aromatic polyamideimide resin was replaced with the aromatic polyamideimide resin obtained in Comparative Example 5. Table 3 shows the results.

TABLE 3

|  | Polyamide-imide (part by weight) (obtained in) | Polyphenylene sulfide (part by weight) | Additive (part by weight) | Glass fiber (part by weight) | Heat-deformation temperature (load: 18.6 kg) (°C.) | Melt flow value (before kneading) $Q_0$ (cc/sec) | Melt flow value (after kneading) $Q_1$ (cc/sec) | $Q_1/Q_0$ |
|---|---|---|---|---|---|---|---|---|
| Ex. 12 | 50 (Ex. 1) | 50 | — | — | 220 | $3.1 \times 10^{-1}$ | $3.3 \times 10^{-1}$ | 1.06 |
| Comp. Ex. 11 | 50 (Comp. Ex. 2) | 50 | — | — | 224 | $7.0 \times 10^{-2}$ | $1.2 \times 10^{-2}$ | 0.17 |
| Comp. Ex. 12 | — | 100 | — | — | 102 | unmeasurable | $7.6 \times 10^{-2}$ | — |
| Ex. 13 | 60 (Ex. 1) | 40 | MDI 2 part by weight zinc montanate | — | 240 | $2.0 \times 10^{-1}$ | $1.3 \times 10^{-1}$ | 0.65 |

TABLE 3-continued

| | Polyamide-imide (part by weight) (obtained in) | Polyphenylene sulfide (part by weight) | Additive (part by weight) | Glass fiber (part by weight) | Heat-deformation temperature (load: 18.6 kg) (°C.) | Melt flow value (before kneading) $Q_0$ (cc/sec) | Melt flow value (after kneading) $Q_1$ (cc/sec) | $Q_1/Q_0$ |
|---|---|---|---|---|---|---|---|---|
| Comp. Ex. 13 | 60 (Comp. Ex. 2) | 40 | 0.1 part by weight MDI 2 part by weight zinc montanate | — | 242 | $2.1 \times 10^{-2}$ | $4.0 \times 10^{-3}$ | 0.19 |
| Ex. 14 | 60 (Ex. 6) | 40 | 0.1 part by weight MDI 2 part by weight zinc montanate | — | 238 | $2.6 \times 10^{-1}$ | $1.8 \times 10^{-1}$ | 0.69 |
| Comp. Ex. 14 | 60 (Comp. Ex. 5) | 40 | 0.1 part by weight MDI 2 part by weight zinc montanate | — | 240 | $3.4 \times 10^{-2}$ | $5.2 \times 10^{-3}$ | 0.15 |

Ex. = Example
Comp. Ex. = Comparative Example

Example 15

Example 13 was repeated except that the aromatic polyamideimide resin was replaced with the aromatic polyamideimide resin obtained in Example 5 and that the zinc montanate was replaced with 0.2 parts by weight of sodium stearate. Table 4 shows the results.

Comparative Example 15

Example 15 was repeated except that the aromatic polyamideimide resin was replaced with the aromatic polyamideimide resin obtained in Comparative Example 4. Table 4 shows the results.

Example 16

The aromatic polyamideimide resin obtained in Example 1, a polyphenylene sulfide resin (trade name: T-4, supplied by Toprene Co., Ltd), a glass fiber (FT540, supplied by Asahi Fiber Glass Co., Ltd.) and zinc montanate were blended in amounts shown in Table 3, and the blend was melt-kneaded at 360° C. and pelletized with a twin-screw extruder to give a resin composition. The pellets were injection-molded to prepare transverse test pieces having a thickness of ⅛ inch. The test piece was measured for a heat deformation temperature (18.6 kg), and the pellets were measured for a melt flow value at 350° C. at a stress of 60 kg/cm². The residence stability of the composition was evaluated in the same manner as in Example 12. Table 4 shows the results.

Comparative Example 16

Example 16 was repeated except that the aromatic polyamideimide resin was replaced with the aromatic polyamideimide resin obtained in Comparative Example 2. Table 4 shows the results.

Example 17

Example 16 was repeated except that the aromatic polyamideimide resin was replaced with the aromatic polyamideimide resin obtained in Example 6. Table 4 shows the results.

Comparative Example 17

Example 16 was repeated except that the aromatic polyamideimide resin was replaced with the aromatic polyamideimide resin obtained in Comparative Example 5. Table 4 shows the results.

Example 18

Example 16 was repeated except that the aromatic polyamideimide resin was replaced with the aromatic polyamideimide resin obtained in Example 5 and that the zinc montanate was replaced with 0.1 part of sodium stearate. Table 4 shows the results.

Comparative Example 18

Example 18 was repeated except that the aromatic polyamideimide resin was replaced with the aromatic polyamideimide resin obtained in Comparative Example 4. Table 4 shows the results.

TABLE 4

| | Polyamide-imide (part by weight) (obtained in) | Polyphenylene sulfide (part by weight) | Additive (part by weight) | Glass fiber (part by weight) | Heat-deformation temperature (load: 18.6 kg) (°C.) | Melt flow value (before kneading) $Q_0$ (cc/sec) | Melt flow value (after kneading) $Q_1$ (cc/sec) | $Q_1/Q_0$ |
|---|---|---|---|---|---|---|---|---|
| Ex. 15 | 60 (Ex. 5) | 40 | MDI 2 part by weight Sodium stearate 0.2 part by weight | — | 228 | $9.0 \times 10^{-2}$ | $5.5 \times 10^{-2}$ | 0.61 |
| Comp. Ex. 15 | 60 (Comp. Ex. 4) | 40 | MDI 2 part by weight Sodium stearate 0.2 part by weight | — | 229 | $8.7 \times 10^{-3}$ | $6.7 \times 10^{-4}$ | 0.08 |
| Ex. 16 | 25 (Ex. 1) | 35 | Zinc montanate 0.1 part by | 40 | 275 | $1.5 \times 10^{-1}$ | $7.0 \times 10^{-2}$ | 0.47 |

TABLE 4-continued

| | Polyamide-imide (part by weight) (obtained in) | Polyphenylene sulfide (part by weight) | Additive (part by weight) | Glass fiber (part by weight) | Heat-deformation temperature (load: 18.6 kg) (°C.) | Melt flow value (before kneading) $Q_0$ (cc/sec) | Melt flow value (after kneading) $Q_1$ (cc/sec) | $Q_1/Q_0$ |
|---|---|---|---|---|---|---|---|---|
| Comp. Ex. 16 | 25 (Comp. Ex. 2) | 35 | Zinc montanate 0.1 part by weight | 40 | 273 | $3.0 \times 10^{-2}$ | $3.0 \times 10^{-4}$ | 0.01 |
| Ex. 17 | 25 (Ex. 3) | 35 | Zinc montanate 0.1 part by weight | 40 | 273 | $2.2 \times 10^{-1}$ | $9.2 \times 10^{-2}$ | 0.42 |
| Comp. Ex. 17 | 25 (Comp. Ex. 5) | 35 | Zinc montanate 0.1 part by weight | 40 | 274 | $6.0 \times 10^{-2}$ | $1.8 \times 10^{-3}$ | 0.03 |
| Ex. 18 | 25 (Ex. 5) | 35 | Zinc stearate 0.1 part by weight | 40 | 272 | $1.2 \times 10^{-1}$ | $3.2 \times 10^{-2}$ | 0.27 |
| Comp. Ex. 18 | 25 (Comp. Ex. 4) | 35 | Zinc stearate 0.1 part by weight | 40 | 273 | $1.5 \times 10^{-2}$ | $2.0 \times 10^{-4}$ | 0.01 |

Ex. = Example
Comp. Ex. = Comparative Example

What is claimed is:

1. A resin composition comprising a melt-kneaded product of:

(A) an aromatic polyamideimide resin (Component A) which is obtained by polymerizing an aromatic tricarboxylic acid anhydride and a diisocyanate in a solvent under conditions where an amide group is substantially formed first and then an imide group is formed, and which has at least one recurring unit of the formula (1),

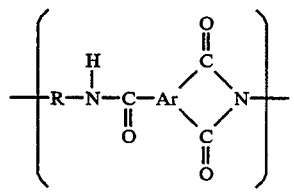

(1)

wherein Ar is a trivalent aromatic hydrocarbon group having at least one 6-membered carbon ring, and R is a divalent aromatic hydrocarbon group or an aliphatic hydrocarbon group, and (B) a polyphenylene sulfide resin (Component B).

2. The resin composition of claim 1, wherein the aromatic polyamideimide resin (Component A) and the polyphenylene sulfide resin (Component B) are contained in a Component A:Component B weight ratio of 5:95 to 95:5.

3. The resin composition of claim 1, wherein the aromatic polyamideimide resin (Component A) and the polyphenylene sulfide resin (Component B) are contained in a Component A:Component B weight ratio of 20:80 to 70:30.

4. The resin composition of claim 1, wherein the aromatic polyamideimide resin (Component A) is a resin obtained from polymerizing an aromatic tricarboxylic acid anhydride and a diisocyanate in a solvent by first substantially forming an amide group at a temperature between 60° C. and 100° C. and then forming an imide group at a temperature between 105° C. and 180° C.

5. The resin composition of claim 1, wherein the aromatic polyamideimide resin (Component A) is a resin obtained from trimellitic anhydride as the aromatic tricarboxylic acid anhydride and at least one member selected from the group consisting of m-phenylene diisocyanate, tolylene diisocyanate and 4,4'-diphenylmethane diisocyanate as the diisocyanate.

6. The resin composition of claim 1, wherein the polyphenylene sulfide resin (B) contains at least 70 mol % of a recurring unit of the formula

7. The resin composition of claim 1, wherein the polyphenylene sulfide resin contains at least 80 mol % of a recurring unit of the formula

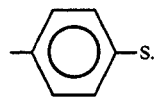

8. A molded article obtained by molding the resin composition recited in claim 1.

* * * * *